(12) United States Patent
Stoodley

(10) Patent No.: US 9,164,783 B2
(45) Date of Patent: Oct. 20, 2015

(54) LOAD TIME RESOLUTION FOR DYNAMIC BINDING LANGUAGES

(75) Inventor: Mark G. Stoodley, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1570 days.

(21) Appl. No.: 11/841,224

(22) Filed: Aug. 20, 2007

(65) Prior Publication Data

US 2009/0055808 A1 Feb. 26, 2009

(51) Int. Cl.
*G06F 9/45* (2006.01)
*G06F 9/455* (2006.01)

(52) U.S. Cl.
CPC ................... *G06F 9/45516* (2013.01)

(58) Field of Classification Search
CPC ........ G06F 8/41; G06F 8/447; G06F 9/45516
USPC ........................................................ 717/140
See application file for complete search history.

(56) References Cited

U.S. PATENT DOCUMENTS

| | | | |
|---|---|---|---|
| 6,110,226 A | 8/2000 | Bothner | |
| 6,338,160 B1 | 1/2002 | Patel et al. | |
| 2003/0221186 A1* | 11/2003 | Bates et al. | 717/125 |
| 2006/0158354 A1 | 7/2006 | Aberg et al. | |
| 2006/0253847 A1* | 11/2006 | Romanovskiy | 717/153 |
| 2008/0184210 A1* | 7/2008 | Lee et al. | 717/136 |

* cited by examiner

*Primary Examiner* — Anna Deng
(74) *Attorney, Agent, or Firm* — Steven M. Greenberg, Esq.; CRGO Law

(57) ABSTRACT

Embodiments of the present invention address deficiencies of the art in respect to load time resolutions and provide a method, system and computer program product for load time resolution of AOT compiled class references in a dynamic binding executing environment. In one embodiment of the invention, a method of resolving class references in AOT compiled code can be provided. The method can include updating AOT code at loading time for already resolved class references in the AOT code, and executing the updated AOT code to resolve remaining unresolved class references in the updated AOT code.

12 Claims, 2 Drawing Sheets

LOAD TIME RESOLUTION FOR DYNAMIC BINDING LANGUAGES

BACKGROUND OF THE INVENTION

1. Field of the Invention

The present invention relates to the field of reference resolution for compiled program code and more particularly to resolving references in ahead-of-time (AOT) compiled program code.

2. Description of the Related Art

Software development has evolved over time from direct specification of a sequence of processor instructions, to the interpretation of high level source code into a sequence of processor instructions, to the compilation of high level source code into a sequence of processor instructions, to the compilation of high level source code into interpretable intermediate code able to be interpreted at run-time into a sequence of processor instructions. Initial software development focused on the delivery of functionality of code irrespective of the performance of the code at execution time. Over time, however, the complexity of software has compelled strong consideration of the performance implications of design choices in software development.

Just in time (JIT) compilation reflects one design choice in software development having an impact on program performance. In JIT compilation, source code is compiled into an intermediate format such as bytecode. The intermediate format, in turn, at the time of execution, is transformed into the machine instructions specific to the host computing platform. The performance enhancement resulting from JIT compilation originates from caching the results of translating blocks of code, and not simply evaluating each line or operand separately, or compiling the code at development time. Ahead of time (AOT) compilation differs from JIT compilation in that in AOT compilation, the transformation of the bytecode occurs prior to execution. AOT-oriented virtual machines enjoy execution time performance advantages over JIT-oriented virtual machines because the AOT-oriented virtual machine need not waste execution time processor cycles interpretation, profiling, and compiling intermediate bytecode so optimized programs run fast from start-up.

Irrespective of JIT or AOT compilation, the Java virtual machine (JVM) requires that all references to classes, instance fields, static fields, and methods within program code be resolved when each reference is first executed. In this regard, code generated for any reference that has not yet been resolved at compile time must cause the resolution to occur. Typically, resolution can be expensive and occurs when code is first executed. For code that is compiled AOT, almost all references must be unresolved because only the class of the method being compiled can be assumed to be resolved while the method is being compiled. Even references to superclasses within source code must be treated as unresolved during AOT compilation since the actual super-class loaded at runtime need not be the same class as when the code is AOT compiled nor even every time the JVM is invoked to execute the AOT compiled code.

While most applications do not have strict requirements for the time consumed when first executing a method, real-time applications have a high degree of sensitivity towards the delay experienced when first executing a method. Specifically, in a real-time environment, the first execution of a method or even one path inside a method must meet specified timing guarantees in order to operate correctly in the environment. Yet, in a virtual machine employing native code generated by an AOT compiler, forcing all applications to meet a deadline based upon the first execution time cost can be too restrictive since the first execution of a method is often much slower than subsequent executions because of the time required to resolve all class, field, and method references.

A virtual machine employing native code compiled by a compiler can avoid the first execution time cost as most references in a JIT environment are resolved prior to first execution of the JIT compiled code due to the repeated interpretation of the code prior to compilation. Still, real-time applications do not generally prefer to have a JIT compiler active since a run-time compiler can introduce too much non-determinism into the execution behavior of the application. Consequently, it is preferred to employ AOT generated code, in which almost all class, instance field, static field, and method references are treated as unresolved though the first execution time penalty for all resolutions can be prohibitive.

BRIEF SUMMARY OF THE INVENTION

Embodiments of the present invention address deficiencies of the art in respect to load time resolutions and provide a novel and non-obvious method, system and computer program product for load time resolution of AOT compiled class and class data in a dynamic binding executing environment. In one embodiment of the invention, a method of resolving references to class, field and method instances in AOT compiled code can be provided. The method can include updating AOT code at loading time for already resolved references in the AOT code for any of class, class field or class method instances, and executing the updated AOT code to resolve remaining unresolved references in the updated AOT code.

In one aspect of the embodiment, updating AOT code at loading time for already resolved references in the AOT code can include retrieving relocation records associated with unresolved class, class field, or class method instance references for the AOT code, and updating the AOT code for each of the retrieved relocation records associated with a reference determined to have been already resolved. In another aspect of the embodiment, updating the AOT code for each of the retrieved relocation records associated with a reference determined to have been already resolved can include inserting a resolved address for each of the already resolved class references at specified offsets in corresponding ones of the retrieved relocation records. In yet another aspect of the embodiment, updating AOT code at loading time for already resolved class references in the AOT code can include updating AOT code at loading time for already resolved class, class field or class method references in the AOT code.

In another embodiment of the invention, an AOT compiled code data processing system can be provided. The system can include a virtual machine configured to support dynamic binding, a class loader and an execution engine programmed to execute AOT code and to resolve unresolved class, class field and class method instance references in the AOT code. The system further can include load time reference resolution logic coupled to the class loader. The logic can include program code enabled to update the AOT code at loading time prior to execution in the execution engine for already resolved class, class field and class method instance references in the AOT code.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for class, class field and class method instance reference resolution in a dynamic binding language execution environment. In an embodiment of the invention, program code within a computer program can be AOT compiled. Thereafter, the AOT compiled program code can be loaded. During loading, relocation records associated with corresponding references within the AOT compiled code can be processed to determine whether or not different references to any of class, class field or class method instances have already been resolved. For each reference that already has been resolved, a corresponding address in the AOT code specified by the relocation records can be updated with the resolved reference. Each reference processed in this way need not be resolved on first execution. In this way, a number of references which must be resolved at first execution time can be reduced and the performance variance between first execution and subsequent execution of the computer program can be diminished.

Figure 1:
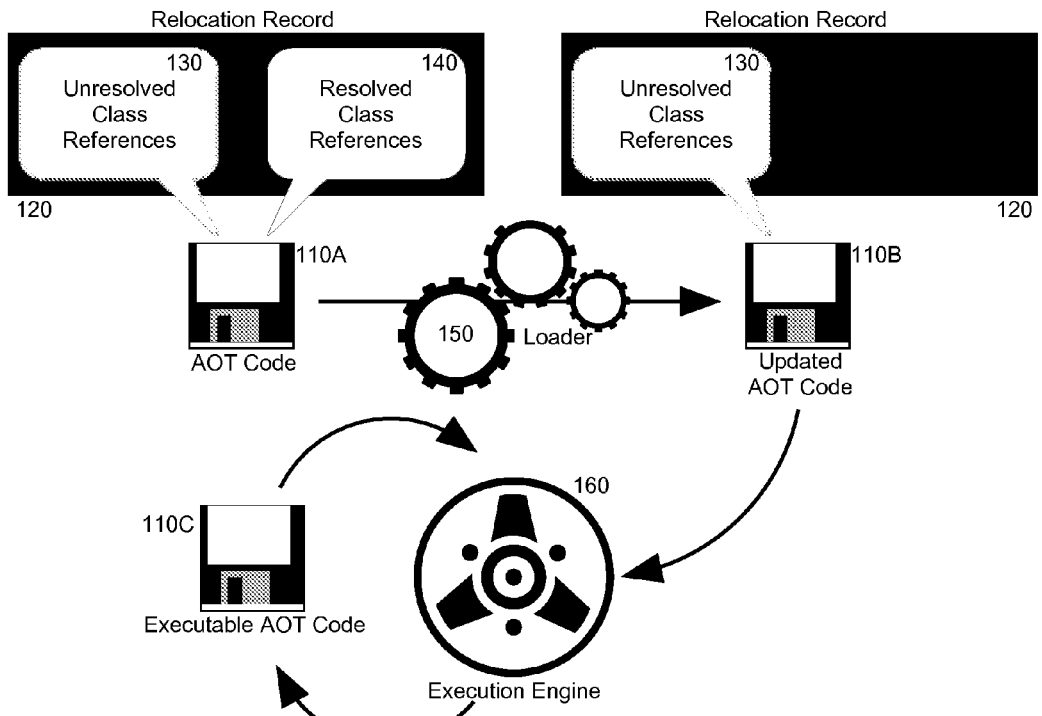
FIG. 1 is a pictorial illustration of the load time resolution of an AOT compiled class, class field and class method instance in a dynamic binding executing environment.

In further illustration, FIG. 1 is a pictorial illustration of the load time resolution of an AOT compiled class, class field and class method instance data in a dynamic binding executing environment such as a Java virtual machine (JVM). Specifically, AOT code 110A can include a relocation record header 120 specifying a set of class, class field and class method instance references that can include both class, class field and class method instance references 130 that are as-yet unresolved at the load time of the AOT code 110A and class, class field and class method instance references 140 that have been resolved as of the load time for this AOT code. Both the unresolved class, class field and class method instance references 130 and the resolved class, class field and class method instance references 140 can refer not only to class instances, but also to class members such as method members and data field members, both in dynamic and static form. The AOT code 110A can be passed into loader 150 during which time the resolved class references 140 can be identified and processed by updating the AOT code 110A into updated AOT code 110B with the addressing for the resolved class references being provided at the offsets listed in the relocation record 120.

Thereafter, the updated AOT code 110B can be provided to the execution engine 160 of the environment. Within the execution environment 160, the updated AOT code 110B can be executed and the remaining unresolved class references 130 can be resolved at execution time producing the executable AOT code 110C. However, with the resolved references 140 having been processed at loading time in the loader 150 rather than at execution time in the execution engine 160, the cost of processing the resolved references 130 will have been shifted from execution time to loading time and the variance in performance at each instance of execution will diminish.

Figure 2:
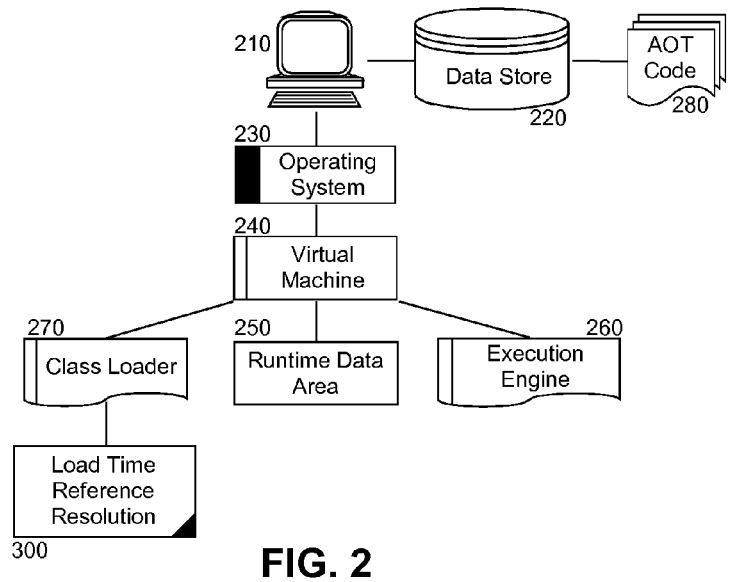
FIG. 2 is a schematic illustration of a code compilation data processing system configured for load time resolution of an AOT compiled class, class field and class method instance in a dynamic binding executing environment; and, FIG. 3 is a flow chart illustrating a process for the load time resolution of an AOT compiled class, class field and class method instance in a dynamic binding executing environment.

The process described herein can be embodied within a dynamic binding language processing environment such as the JVM. To that end, FIG. 2 is a schematic illustration of a code compilation data processing system configured for load time resolution of an AOT compiled class and class data in a dynamic binding executing environment like a JVM. Referring to FIG. 2, a host computing platform 210 and coupled fixed storage 220 can support the operation of an operating system 230. The operating system 230 in turn can provide an execution environment for a virtual machine 240.

The virtual machine 240 can include a runtime data area 250 including a method area, a heap, program stacks for both native and non-native methods and registers for the host computing platform 210. The virtual machine 240 also can include a class loader 270 and an execution engine 260. Notably, load time reference resolution logic 300 can be coupled to the class loader 270. In this regard, the load time reference resolution logic 300 can include program code enabled to process AOT code 280 in fixed storage 220 during load time to update the AOT code 280 for resolved class references in the AOT code 280 prior to providing the AOT code 280 to the execution engine for execution.

In particular, the relocation record of the AOT code 280 can be modified to account for class, class field and class method instance references in the AOT code 280. An exemplary relocation record entry can include

| Relocate class resolve C1 | 0x30 0x44 0x8C 0xA0 |
|---|---| for the class instance reference to C1. In this example, the address assigned to C1 at load time can be provided at each of the AOT code offsets 0x30, 0x44, 0x8C and 0xA0. The relocation record can be applied not only to class instances, but also to method invocations within the class, instance field references, static field references and the like. Accordingly, another exemplary relocation record entry can include

| Relocate static field resolve C2.count | 0x54 0x80 |
|---|---| for the static field record "count" in class instance C2.

Notably, no changes to the generated AOT code 280 are required other than the introduction of the relocation records for the class instance and class instance member relocation record entries. Rather, the AOT code 280 is be generated so as to resolve the reference on first execution. If the relocation step in the class loader 270 is unable to resolve a class instance at relocation time, then the AOT code 280 will remain unchanged and the execution engine 260 will perform the resolution on first execution.

Figure 3:
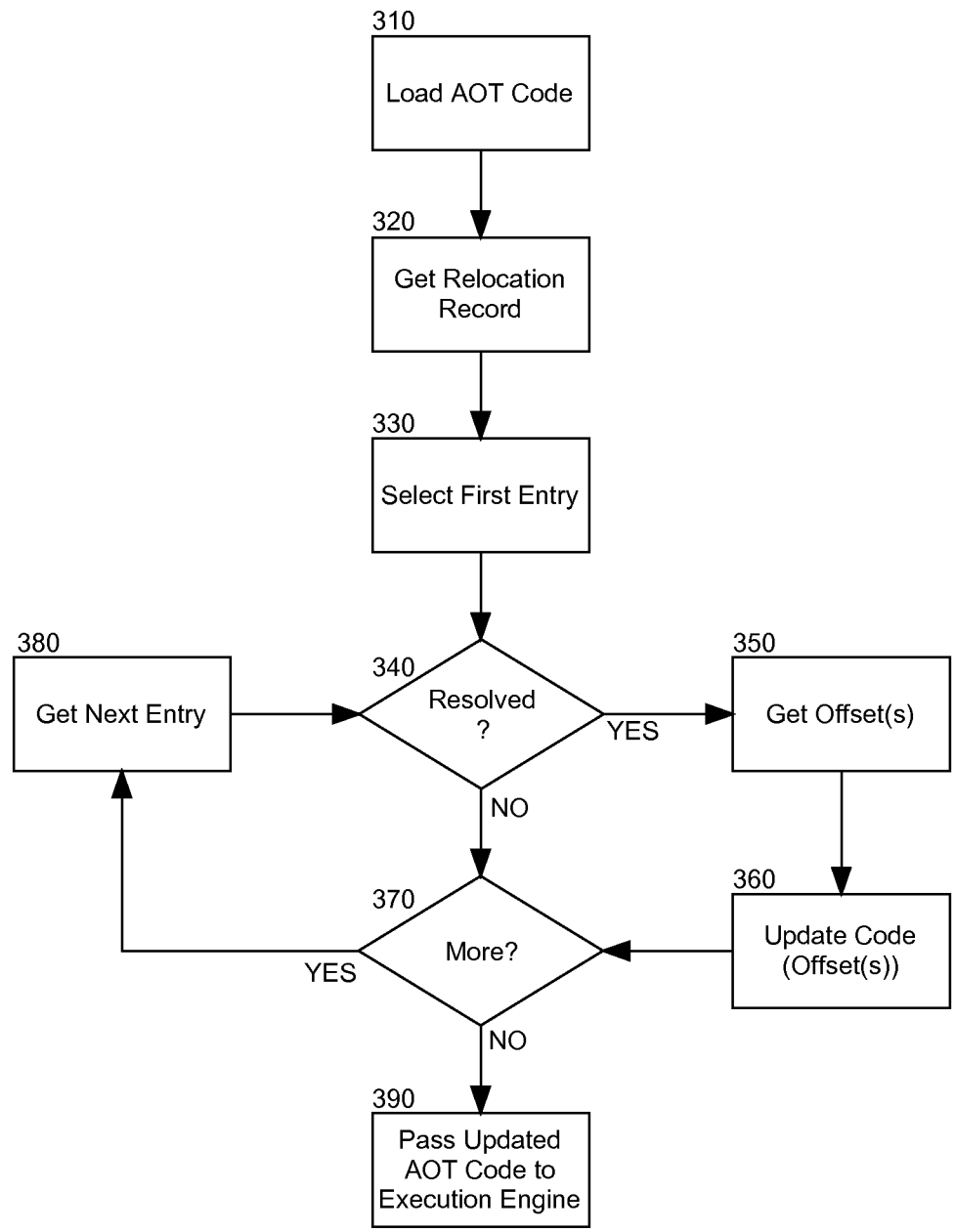

In yet further illustration of the operation of the load time reference resolution logic 300, FIG. 3 is a flow chart illustrating a process for the load time resolution of an AOT compiled class and class data in a dynamic binding executing environment. Beginning in block 310, AOT code can be loaded for execution in a virtual machine configured for dynamic binding. In block 320, the relocation records for the AOT code can be retrieved for processing and in block 330, a first entry in the relocation records can be selected for processing.

In decision block 340, if the entry refers to a class instance or field in a class instance that has been resolved, in block 350 the offset or offsets for the entry can be retrieved and an address for the class instance or field in the class instance can be placed at each offset in the AOT code in block 360. In decision block 370, if additional entries in the relocation records remain to be processed, in block 380 a next entry can be selected for processing. In decision block 370, when no further entries remain to be processed in the relocation records, in block 390 the updated AOT code can be passed to the execution engine for execution in the virtual machine. Yet, if a sufficient number of resolution relocations can be performed at loading time, then the variance in execution time between the first and subsequent executions of all code paths in the AOT code will be substantially reduced, allowing the AOT code to better support real-time application development.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method of resolving references in ahead-of-time (AOT) compiled code, the method comprising:
   loading into a class loader AOT code comprising a header as a relocation record specifying a set of classes, a class field and class method instance references that are as-yet unresolved at load time of the AOT code and class, class field and class method instance references that have been resolved as of the load time of the AOT code;
   updating the AOT code, at loading time, into updated AOT code for already resolved class references with specific addresses being provided at offsets listed in the relocation record; and,
   executing the updated AOT code to resolve remaining unresolved class references into the updated AOT code to produce executable AOT code.

2. The method of claim 1, wherein updating AOT code at loading time for already resolved class references in the AOT code, comprises:
   retrieving the relocation record for the AOT code; and,
   updating the AOT code for the retrieved relocation record determined to have been already resolved.

3. The method of claim 2, wherein updating the AOT code for the retrieved relocation record determined to have been already resolved, comprises inserting a resolved address for each of the already resolved class references at specified offsets in the AOT code.

4. The method of claim 1, wherein updating AOT code at loading time for already resolved class references in the AOT code, comprises updating AOT code at loading time for already resolved class, class field and class method instance references in the AOT code.

5. An ahead-of-time (AOT) compiled code data processing system comprising:
   a virtual machine configured to support dynamic binding;
   a class loader programmed to load AOT code comprising a header as a relocation record specifying a set of classes, a class field and class method instance references that are as-yet unresolved at load time of the AOT code and class, class field and class method instance references that have been resolved as of the load time of the AOT code;
   load time reference resolution logic coupled to the class loader, the logic comprising program code enabled to update the AOT code, at loading time prior to execution in the execution engine, into updated AOT code for already resolved class references with specific addresses being provided at offsets listed in the relocation record; and,
   an execution engine programmed to execute the updated AOT code to resolve remaining unresolved class references in into the updated AOT code to product executable AOT code.

6. The system of claim 5, wherein, the relocation record comprising entries, each entry specifying a class instance to be relocated based upon at least one specified offset.

7. The system of claim 6, wherein the relocation record further comprise additional entries, each additional entry specifying a class instance field to be relocated based upon at least one specified offset.

8. The system of claim 6, wherein the relocation record further comprise additional entries, each additional entry specifying a class instance method invocation to be relocated based upon at least one specified offset.

9. A computer program product comprising a processor and a computer usable storage memory device storing computer usable program code for resolving references in ahead-of-time (AOT) compiled code, the computer program product comprising:

computer usable program code for loading into a class loader AOT code comprising a header as a relocation record specifying a set of classes, a class field and class method instance references that are as-yet unresolved at load time of the AOT code and class, class field and class method instance references that have been resolved as of the load time of the AOT code;

computer usable program code for updating the AOT code, at loading time, into updated AOT code for already resolved class references with specific addresses being provided at offsets listed in the relocation record; and, computer usable program code for executing the updated AOT code to resolve remaining unresolved class references into the updated AOT code to produce executable AOT code.

10. The computer program product of claim 9, wherein the computer usable program code for updating AOT code at loading time for already resolved class references in the AOT code, comprises:

computer usable program code for retrieving the relocation record for the AOT code; and, computer usable program code for updating the AOT code for the retrieved relocation record determined to have been already resolved.

11. The computer program product of claim 10, wherein the computer usable program code for updating the AOT code for the retrieved relocation record determined to have been already resolved, comprises computer usable program code for inserting a resolved address for each of the already resolved class references at specified offsets in the AOT code.

12. The computer program product of claim 9, wherein the computer usable program code for updating AOT code at loading time for already resolved class references in the AOT code, comprises computer usable program code for updating AOT code at loading time for already resolved class, class field and class method instance references in the AOT code.

* * * * *